June 20, 1944.  H. W. DRIEHAUS  2,351,746
POWER TRANSMISSION DEVICE
Filed Feb. 5, 1943  4 Sheets-Sheet 4
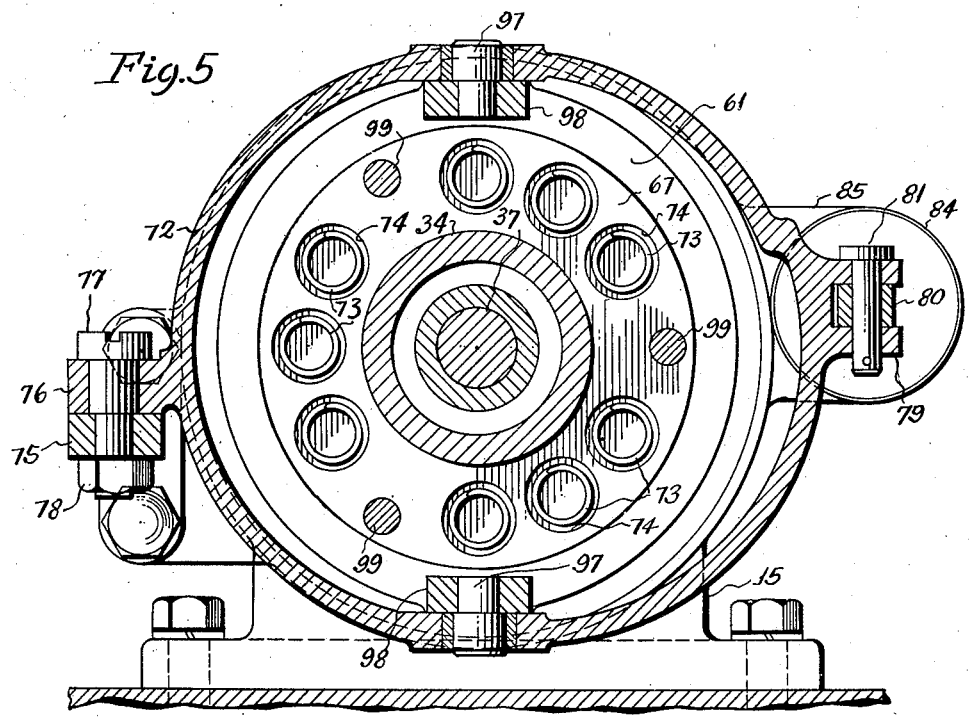
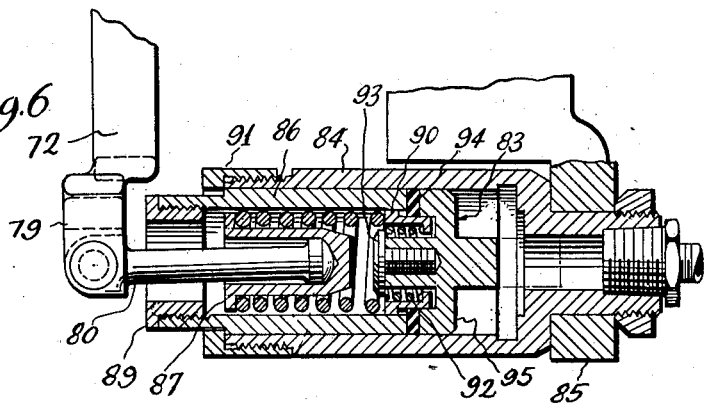
INVENTOR.
Herman W Driehaus
BY
Clarence F. Poole
ATTORNEY Patented June 20, 1944

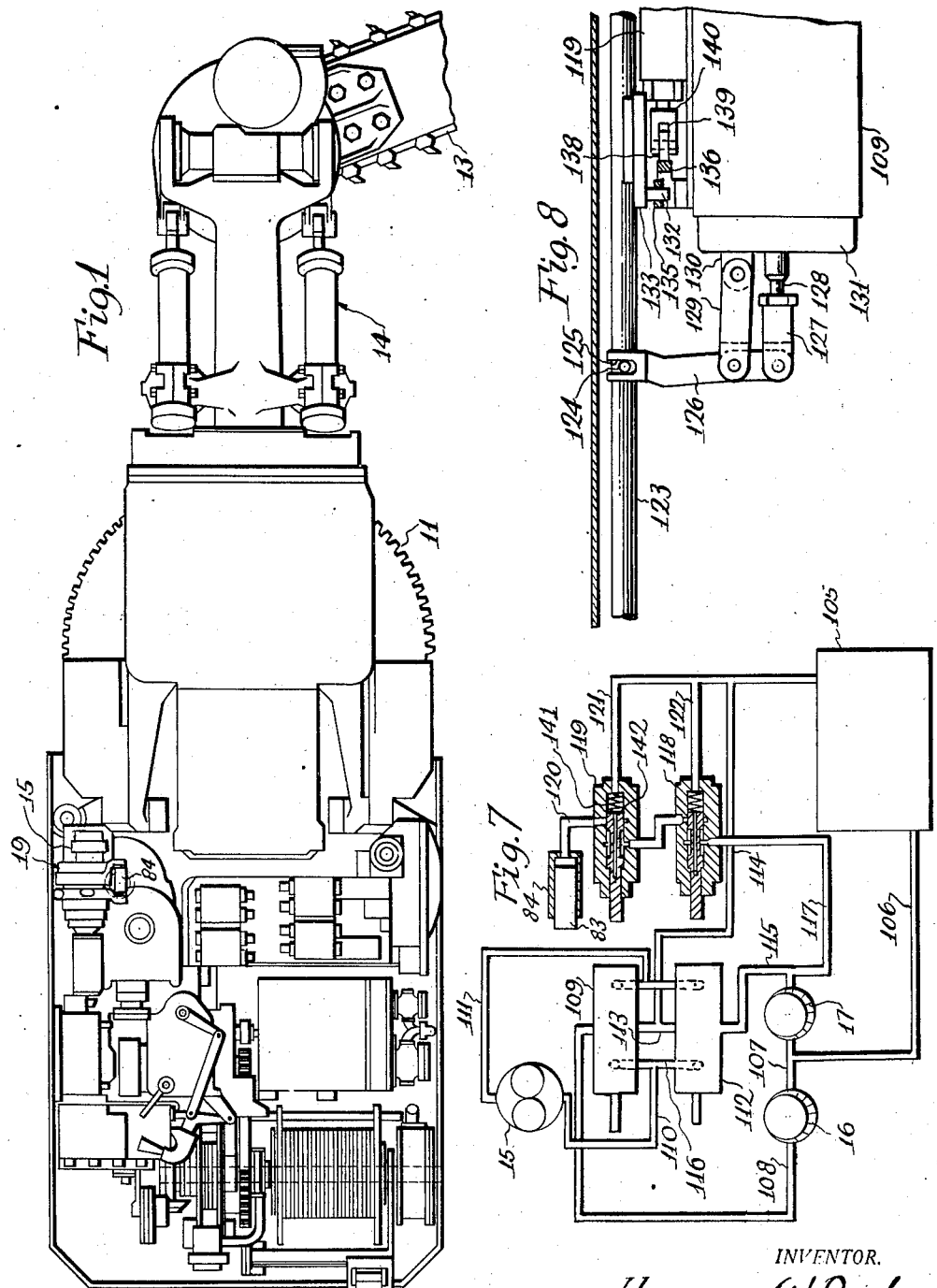

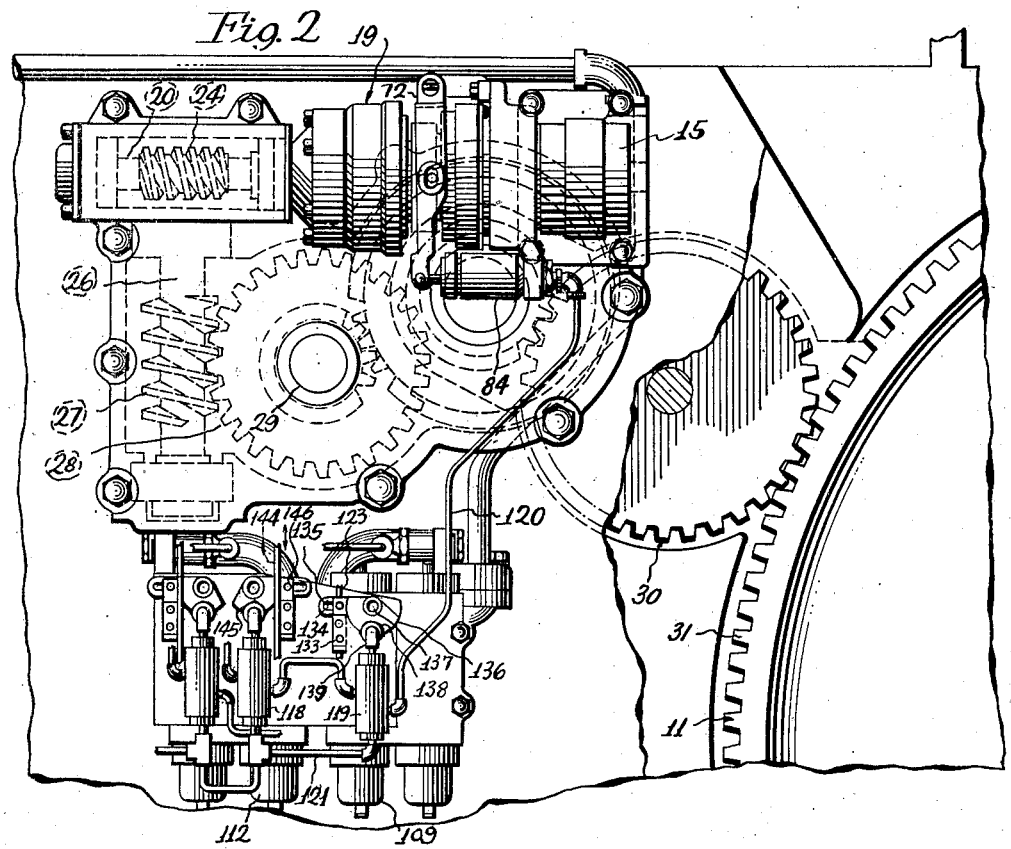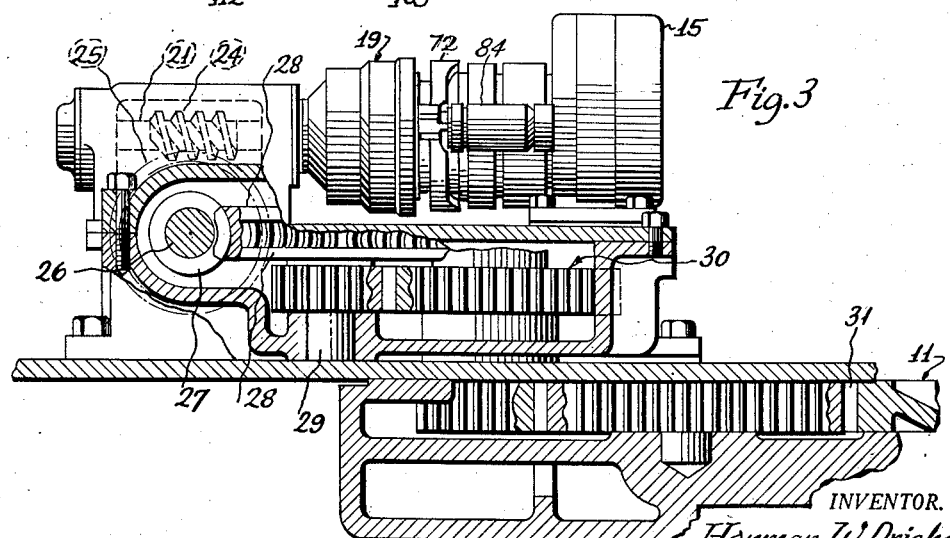

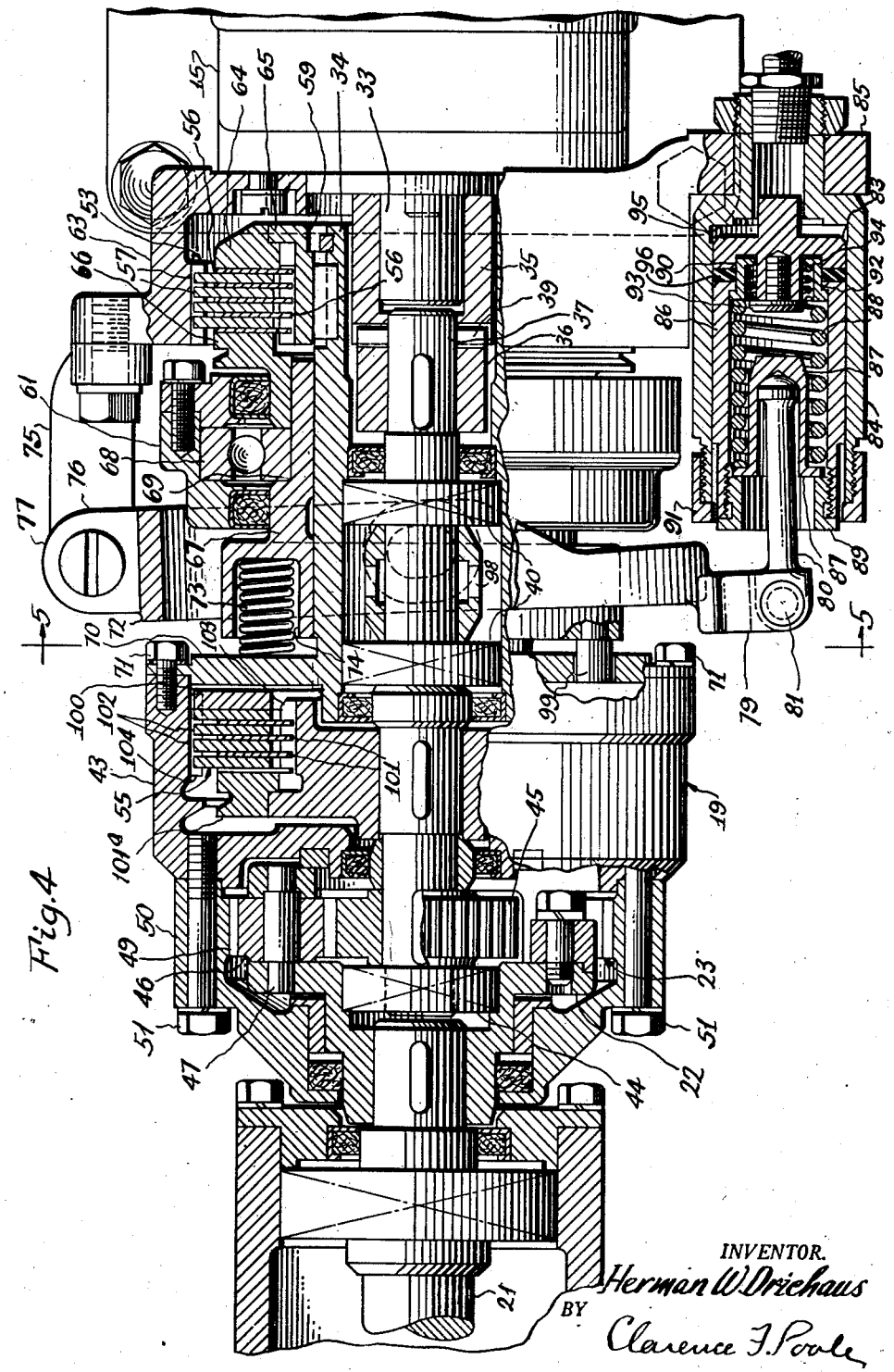

2,351,746

UNITED STATES PATENT OFFICE 2,351,746

POWER TRANSMISSION DEVICE

Herman W. Driehaus, Chicago, Ill., assignor to Goodman Manufacturing Company, Chicago, Ill., a corporation of Illinois Application February 5, 1943, Serial No. 474,781

9 Claims. (Cl. 74—189.5)

This invention relates to improvements in power transmission devices and more particularly relates to an improved automatic power transmission device particularly adapted to transmit power from a fluid motor to a turntable of a kerf-cutting machine.

The present invention relates to a power transmission device somewhat similar to that shown and described in an application Serial No. 422,789, filed by William W. Sloane on December 13, 1941, but instead of relying upon a centrifugal clutch to change the speeds of the driven member of the power transmission device, utilizes a novel form of fluid pressure control for changing the speeds transmitted by the power transmission device, as the speeds of rotation of the drive motor therefor are changed.

The principal objects of my present invention are to provide a simplified form of power transmission device in the drive between a fluid motor and a turntable of a kerf-cutting machine wherein the speed of the motor is varied to turn the turntable at slow cutting speeds and at a higher positioning speed, and in so arranging this power transmission device that a reduction in speed of a driven member thereof will be obtained when the motor is operating at a slow speed, and the driven member will be driven at the speed of rotation of the motor when the motor is operating at higher speeds, to take care of inefficiencies caused by leakage of fluid when the motor is rotating at a slow cutting speed and to provide an efficient drive from the fluid motor at all speeds of rotation thereof.

A more specific object of my invention is to provide a novel form of power transmission device and fluid controls therefor, and in so arranging the fluid controls as to automatically shift the power transmission device to drive its driven member at a higher or lower speed, as the speed of the fluid motor is changed.

Other objects of my invention will appear from time to time as the following specification proceeds and with reference to the accompanying drawings wherein:

Figure 1 is a plan view of a kerf-cutting machine of the track-mounted type having a fluid drive and transmission constructed in accordance with my invention associated therewith;

Figure 2 is an enlarged detail fragmentary plan view illustrating certain details of the drive to the turntable supporting the cutting mechanism of the kerf-cutting machine, with certain parts thereof broken away and certain other parts shown in horizontal section;

Figure 3 is a longitudinal sectional view taken through the drive to the turntable;

Figure 4 is a plan view of the power transmission device with certain parts broken away and with certain other parts shown in horizontal section;

Figure 5 is a transverse sectional view taken substantially along line 5—5 of Figure 4;

Figure 6 is an enlarged detail sectional view of the fluid cylinder and piston for operating the power transmission device, showing the piston in a different operating position than in Figure 4;

Figure 7 is a diagrammatic view showing the fluid connections, for driving the fluid motor at either a low speed or at a plurality of predetermined higher speeds, and for controlling operation of the power transmission device; and Figure 8 is an enlarged detail view in side elevation, showing certain details of the control mechanism for the valves, for controlling operation of the turntable and power transmission device.

In the drawings, the embodiment of my invention illustrated is shown as forming a power drive means for a turntable 11 of a kerf-cutting machine of the track-mounted type, for turning said turntable and laterally swinging a chain carrying cutter bar 13 projecting therefrom, across a coal face. Said cutter bar extends from a cutting element generally indicated by reference character 14 and is adjustable with respect thereto and with respect to said turntable to cut a horizontal kerf across a coal face upon feeding movement thereacross by said turntable. The kerf-cutting machine herein illustrated is of a usual type of track-mounted cutting machine commonly known as a slabbing machine, somewhat similar to that illustrated in application Serial No. 369,194, filed by William W. Sloane on December 9, 1940, and is no part of my present invention so will not herein be shown or described in detail.

The drive to the turntable includes a fluid motor 15 of a well known gear type and supplied with fluid under pressure by means of either one or both of a pair of fluid pumps 16 and 17. Said fluid pump 16 is of a lower capacity than the fluid pump 17 and is adapted to drive said motor at a slow feeding speed. Said fluid pump 17 is adapted to supply a greater volume of fluid to the motor 15 than the pump 16, to drive said motor at an intermediate feeding speed. Said second mentioned pump may be used for driving said motor where the cutting is relatively soft and the feeding speed of the cutter bar can safely be increased over that imparted by the pump 16. Both of said fluid pumps acting together are adapted to drive said motor at a higher positioning speed, to position said cutter bar for cutting and to move said cutter bar back and forth across a kerf cut in a coal face to cause said cutter bar to rake any loose cuttings or slate therefrom.

The fluid motor 15 has direct driving connection with a power transmission device 19 through its motor shaft. Said power transmission device in turn has driving connection with a driven member 21, herein shown as being a longitudinal shaft keyed to a cage 22 of a planetary geared reduction device 23, forming part of said power transmission device (see Figure 4). The shaft 21 has a worm 24 formed integrally therewith which meshes with a worm gear 25 on a transverse shaft 26 (see Figures 2 and 3). A worm 27 on said transverse shaft meshes with and drives a worm gear 28 on a vertical shaft 29. A spur gear reduction generally indicated by reference character 30 is provided to connect said vertical shaft with gear teeth 31 cut on the outer periphery of said turntable, for driving said turntable (see Figures 2 and 3).

Referring now to Figure 4, illustrating certain details of the power transmission device 19, a motor shaft 33 of the motor 15 extends within and is spaced from the inner periphery of a sleeve 34 of the power transmission device. A coupling member 35 is keyed to said shaft and has driving connection with a coupling member 36 keyed on a coaxial longtiudinally extending shaft 37, through jaws 39, 39. The shaft 37 is journaled adjacent, but inwardly of said coupling member 36 on a pair of longitudinally spaced ball bearings 40, 40 mounted within said sleeve 34. Said shaft extends within a casing 43 of the planetary geared reduction device and is journaled in said casing at its end opposite the motor 15, on a ball bearing 44. Said ball bearing is mounted within the cage 22 of the planetary geared reduction device 23, which cage is keyed to the shaft 21 and is journaled on its hub within an end frame member 50 of said casing.

The planetary geared reduction device 23 includes a spur sun gear 45, keyed on the shaft 37 just inside of the ball bearing 44 and meshing with a planetary pinion 46. Said planetary pinion is freely mounted on a longitudinally extending shaft 47, which is mounted at its opposite ends in the cage 22. Said planetary pinion meshes with an internal gear 49, herein shown as being cut integrally with the inside of the end frame members 50 of the casing 43. Said end frame member is secured to said casing by means of cap screws 51, 51.

A friction brake 53, herein shown as being a multiple disk type of friction brake, is provided to hold the casing 43 from rotation, to cause the planetary pinion 46 to be orbitally driven about the internal gear 49 by the sun gear 45. This will rotatably drive the cage 22 and shaft 21 at a reduced speed. When the brake 53 is disengaged, the internal gear 49 and casing 43 will be free to rotate.

A friction disk clutch 55 is provided within the casing 43 to form a means for rotatably driving said casing with the shaft 37. A means is provided to disengage said friction clutch when the brake 53 is engaged and to engage said clutch when said brake is disengaged. Said means will hereinafter be more clearly described as this specification proceeds. When said clutch is engaged, the shaft 21 will be driven at the speed of rotation of the motor shaft 33, the planetary pinions 46, 46 and the cage 21 rotating as a unit with said casing 43, to drive said shaft 21 therewith at the speed of said shaft 37.

The brake 53 includes a plurality of alternately arranged annular friction disks 56 and 57. The disks 56, 56 are internally splined and the splined portions thereof have engagement with an externally splined member 59, herein shown as being feather keyed on the end of the sleeve 34 adjacent the motor 15. The disks 57, 57 are externally splined and the splined portions thereof have engagement with an internally splined portion of an annular frame member 63, which is secured to an end plate of the motor 15 and is adapted to hold said disks from rotation. An annular retaining member 64 mounted on a flange 65 of the splined member 59 abuts the end disk 56 adjacent the motor 15. An annular abutting member 66 abuts the opposite end disk 56 and serves to apply said friction brake or permit it to be released. Said abutting member is mounted on its hub on an engaging member 67, which is slidably mounted on the sleeve 34.

A ball bearing 68 is mounted on the outside of the engaging member 67 and abuts a shouldered portion 69 thereof at one of its sides, and abuts the annular abutting member 66 at its opposite side. Said bearing is mounted in a split housing 61, which also serves as a shifting member for the brake and encircles the hub of the engaging member 67 and the hub of the abutting member 66.

The end of the engaging member 67 opposite from the motor 15 is of an annular flanged formation, facing an end plate 70 of the casing 43, which end plate is herein shown as being formed integral with the sleeve 34 and is secured to the end of said casing 43 by cap screws 71, 71. Said flanged portion of said sleeve is provided with a plurality of sockets 74, 74 adapted to receive springs 73, 73. Said springs have engagement with said end plate 70 and serve to move the engaging member 67 and abutting member 66 in a direction to hold the friction disks 56 and 57 in engagement with each other and to apply the brake 53.

The brake 53 is released by means of a shifting ring 72, operatively connected with the housing 61 and pivotally connected to a bracket 75 projecting horizontally from the annular frame 63 in a direction towards the planetary unit 23. Said shifting ring is connected to said bracket by means of a lug 76, projecting outwardly from said ring and pivotally connected to said bracket by means of a vertical threaded pin 77, having a nut 78 threaded on its lower end. A bifurcated lug 79 projects from the side of said shifting ring opposite from the lug 76 and is pivotally connected to the free end of a piston rod 80 by means of a pivotal pin 81. Said piston rod serves to operate said ring and extends from a piston 83, movable within a fluid cylinder 84. Said fluid cylinder is mounted on a bracket 85, projecting from the annular frame 63.

The piston rod 80 is mounted in a flanged socket 87, slidably mounted within a cylindrical portion 86 of the piston 83. The inner side of said socket is encircled by a compression spring 88 which abuts the flanged portion of said socket at one of its ends. Said socket is retained in said piston by a flanged retaining nut 89 threaded within the outer end of said piston and engaging the flanged portion of said socket. The opposite end of said spring abuts an outwardly extending flange of a sleeve 90 mounted in the inner end of said cylindrical portion 86 of said piston. Said flanged sleeve has an internally flanged portion which is engaged by a compression spring 92. The opposite end of said spring 92 engages a head of a retaining screw 93, threaded within a boss 94 extending inwardly from a head end 95 of said piston. A packing member 96 is interposed between said cylindrical portion and said head end of said piston. Said packing member is held in compression by said spring 92 and serves to hold said packing member in compression and to prevent leakage of fluid by said piston. A nut 91 threaded in the end of said cylinder is adapted to engage a shouldered portion of said piston and limit movement thereof.

It is apparent from the foregoing that the shifting ring 72 is shifted through the spring 88. In Figure 6 it may be seen that the travel of the piston 83 is greater than the travel of said shifting ring. The brake 53 is thus held in an engaged position by said compression spring, held in compression by fluid under pressure within the cylinder 84. Thus any wear of said brake may be taken up by said spring, rendering adjusting means to take up for wear of the brake unnecessary.

The shifting ring 72 has a pair of coaxial vertical pins 97, 97 extending inwardly from opposite sides thereof. The inner ends of said pins are mounted in bosses 98, 98 formed integrally with the outside of the housing 61 and projecting therefrom towards the end plate 70. Said housing thus forms a means for disengaging the brake 53 through the ball bearing 68 and annular abutting member 66, when fluid under pressure is admitted to the cylinder 84.

The fluid cylinder 84 and piston 83 also serve to apply the friction clutch 55 upon release of the brake 53, through pins 99, 99 mounted in the end face of the flanged portion of the engaging member 67 and extending therefrom in parallel relation with respect to the shaft 37. Said pins extend from said flanged portion of said engaging member through the end plate 70 and are adapted to engage an end engaging plate 100 of said friction clutch. When fluid under pressure is applied to said piston, said pins will engage and move said end plate 100 of said friction disk clutch in a direction to engage alternately arranged disks 101, 101 and 102, 102 of said clutch with each other, to rotatably drive the casing 43 at the speed of rotation of the shaft 37 through a splined drive member 103 keyed on said shaft.

The friction disks 101, 101 are internally splined and the splines thereof have engagement with the splined driving member 103. The disks 102, 102 arranged alternately with said disks 101, 101 are externally splined, and the splines thereof have engagement with splines 104, 104 formed internally of the casing 43, for rotating said casing with said shaft when said disks are in an engaged position. An abutment member 101a is mounted on said drive member 103 and is adapted to abut an end disk 101 of said clutch, to form a reaction member for said clutch.

Referring now in particular to Figure 7 and the fluid connections for supplying fluid under pressure from either one or both of the pumps 16 and 17 to the motor 15, a fluid storage tank 105 is provided. A pressure line 106 leads from said tank and is connected with a branch line 107, which is connected at its opposite ends to said pumps 16 and 17. A pressure line 108 leads from the pump 16 to a valve 109. Said valve may be of any well known type, but is herein shown as being a balanced pressure spool type of valve. A pressure line 110 leads from said valve to the pressure side of the fluid motor 15, to supply fluid under pressure to said motor, to drive said motor from the pump 16 at a relatively slow speed.

A discharge line 111 leads from the motor 15 to the valve 109 and is also connected to a valve 112, which valve is connected with the fluid pump 17 to supply fluid under pressure to said motor from said pump. A low pressure line 113 leads from the discharge side of the valve 109 to the discharge side of the valve 112. Said low pressure line has connection with a return line 114 leading to the tank 105. The valve 112 is connected to the pump 17 through a pressure line 115 and has connection with the pressure side of the motor 15, through a pressure line 116 connected to the pressure line 110 leading from the valve 109.

When the valve 109 is closed and the valve 112 is open, the motor 15 will be driven from the pump 17 at an intermediate feeding speed, and when both valves 109 and 112 are open, the motor will be driven at a high speed, which may be used for positioning the cutter bar for cutting across a face, or for moving the cutter bar back and forth in a kerf which has already been cut, for raking slate or loose cuttings therefrom.

The fluid connections to the fluid cylinder 84 for supplying fluid under pressure thereto include a pressure line 117 connected to the pressure line 115 and leading to a pair of valves 118 and 119, which are herein shown as being connected together in series. A pressure line 120 leads from the valve 119 to said fluid cylinder 84. A return line 121 is connected from the valve 119 to the tank 105. A line 122 connects the valve 118 to said return line.

The valves 118 and 119 are mechanically connected with the respective valves 112 and 109, to open together when said valves 109 and 112 are opened to a position to admit fluid under pressure to drive the motor 15 from the pumps 16 and 17. Said valves 118 and 119, however, are not opened to drain except when the respective valves 112 and 109 are in neutral positions. When said valve 118 is open to let fluid under pressure pass therethrough, and the valve 109 is closed, the valve 119 will be closed to prevent fluid from entering the pressure line 120 and fluid cylinder 84. When the valves 109 and 119 are open, and the valve 112 is closed, the valve 118 will also be closed to prevent the passage of fluid to the cylinder 84. Thus fluid can only enter the fluid cylinder 84, to change the speed of the driven member, when the motor 15 is driven through both of the pumps 16 and 17.

In Figure 2 the valve 118 is shown as being mounted directly above the valve 112 and the valve 119 is shown as being mounted directly above the valve 109. The mechanical connections between said valves 112 and 118 and said valves 109 and 119 are similar, so the connection between the valves 109 and 119 only will herein be described in detail. A valve operating rod 123 is provided to operate the valves 109 and 119. Said rod extends transversely of the machine and has hand grips (not shown) at each end thereof, to permit operation of said valves from either side of the machine. A pin 124 extends through said rod, intermediate its ends, and projects beyond the sides thereof and extends within slots 125, 125 formed in the furcations of a bifurcated lever arm 126. The lower end of said lever arm is pivotally connected between the furcations of a bifurcated connecting member 127, secured to the end of a stem 128 of the valve 109. A link 129 is pivotally connected to a lug 130 projecting from a head 131 of said valve 109 and has pivotal connection at its opposite end to the lever arm 126, intermediate its ends. Thus movement of the valve operating rod 123 in a direction, which in Figure 7 is shown as being to the right, will open the valve 109 to permit fluid to pass from the pump 16 to the motor 15.

The valve 119 is operated by the valve operating rod 123 by means of a pin 132 depending from a plate 133 secured to the bottom of said valve operating rod, and extending therealong for a short part of its length. Said pin is adapted to have slidable engagement with a slot 134 formed in an arm 135 projecting outwardly from a cam 136 (see Figure 2). Said cam is mounted on a vertical shaft 137, and has engagement with a roller 138, mounted between the furcations of a bifurcated connecting member 139, secured to and projecting from the end of the stem of said valve 119. A spring 141 disposed within the body of said valve and engaging the inside of a piston 142 within said valve, normally urges said valve to a closed position. Since said valve is no part of my present invention, said spring and piston are only shown diagrammatically in Figure 7. When, however, the cam 136 is turned about the axis of the shaft 137, to a point where the roller 138 is in engagement with the high spot of said cam, said piston will be moved against said spring to open said valve. This is effected upon movement of the valve operating rod 123 in a direction, which is shown in Figure 8 as being to the right.

The valve 112 is operated by means of a transversely extending valve operating rod 144, similar to the valve operating rod 123. The operative connection between said valve operating rod and said valve is the same as the connection from the valve operating rod 123 to the valve 109. A cam 145, operated through a pin 146 depending from the rod 144, is provided to operate said valve 118 upon operation of said valve 112.

It may be seen from the foregoing that a novel form of transmission device has been provided for transmitting power from a fluid motor, which is particularly adapted to drive a turntable of a kerf-cutting machine, and which is so arranged that when the fluid motor is supplied with fluid under pressure from either one or the other of the pumps 16 or 17, the driven shaft of the power transmission device will be driven through the planetary 23 at a slower speed than the speed of rotation of the fluid motor, but that when said fluid motor is driven at a high rate of speed through both of the pumps 16 and 17, the speed of rotation of the driven shaft will be the same as the speed of rotation of the fluid motor. It may further be seen that this power transmission device is automatically operated upon connection of the two pumps 16 and 17 to the fluid motor 15 and that as soon as one or the other of said pumps is disconnected from said fluid motor, the planetary will automatically be thrown into the gear train, to reduce the speed of rotation of the driven member below the speed of the fluid motor.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a hydraulic power transmission device, a fluid motor having a motor shaft, means for supplying fluid to said motor under different volumes, to control the speed of rotation thereof including a pair of selectively operable fluid valves, a driven shaft, a geared reduction means interposed between said motor shaft and said driven shaft, fluid actuated means for controlling operation of said geared reduction means, and a pair of valves controlled by operation of said first mentioned valves and having operative connection with said fluid actuated means, for supplying fluid under pressure thereto to connect said transmission device to drive said driven shaft at a reduced speed when one or the other of said first mentioned valves is open, to supply fluid to drive said motor at a plurality of low speeds, and to connect said geared reduction device to drive said driven shaft at the speed of said motor shaft, when both of said first mentioned valves are open to drive said motor at a predetermined high speed.

2. In a hydraulic power transmission device, a fluid motor having a motor shaft, a plurality of fluid pumps for supplying fluid to said motor at different volumes to cause said motor to rotate at different speeds, a plurality of selectively operable fluid valves, for controlling the connection of any one or all of said fluid pumps to said motor, a driven shaft, a geared reduction means interposed between said motor shaft and said driven shaft, fluid actuated means for controlling operation of said geared reduction means, and a plurality of fluid valves controlled by operation of said first mentioned valves and having controlling connection with said fluid actuated means, for supplying fluid under pressure thereto, to connect said transmission device to drive said driven shaft through said geared reduction means when any one of said valves is open, to supply fluid under pressure to drive said motor at predetermined low speeds, and to connect said transmission device to drive said driven shaft directly through said motor shaft when all of said valves are open to drive said motor at predetermined high speeds.

3. In a hydraulic power transmission device, a fluid motor having a motor shaft, a plurality of fluid pumps for supplying fluid to said motor at different volumes to cause said motor to rotate at different speeds, a plurality of selectively operable fluid valves, for controlling the connection of any one or all of said fluid pumps to said motor, a driven shaft, planetary reduction means interposed between said motor shaft and said driven shaft, a cylinder and piston for controlling operation of said planetary reduction means, and a plurality of fluid valves controlled by operation of said first mentioned valves to control the supplying of fluid under pressure to said cylinder and piston to cause said driven shaft to be driven through said planetary reduction means when said motor is rotating at a low speed, and to cause said driven shaft to be driven at the speed of said motor shaft as the speed of said motor is increased to a predetermined value.

4. In a hydraulic power transmission device, a fluid motor having a motor shaft, a plurality of fluid pumps for supplying fluid to said motor at different volumes to cause said motor to rotate at different speeds, a plurality of selectively operable fluid valves, for controlling the connection of any one or all of said fluid pumps to said motor, a driven shaft, planetary reduction means interposed between said motor shaft and said driven shaft, a cylinder and piston for controlling operation of said planetary reduction means, a fluid valve associated with each one of said first mentioned valves and mechanically connected therewith to open as said first mentioned valves are opened, to supply fluid under pressure to said cylinder and piston when all of said first mentioned valves are opened, to cause said piston to connect said transmission device to drive said driven shaft at the speed of said motor shaft, when said motor is driven from all of said pumps, and for releasing fluid pressure from said cylinder and piston when said motor is driven from any one of said pumps, to connect said transmission device to drive said driven shaft through said planetary when said motor is rotating at a predetermined slow speed.

5. In a hydraulic power transmission device, a fluid motor having a motor shaft, two fluid pumps for supplying fluid to said motor at different volumes to cause said motor to rotate at different speeds, two selectively operable fluid valves for connecting any one or all of said pumps to supply fluid under pressure to said motor, a driven shaft, planetary reduction means interposed between said motor shaft and said driven shaft, fluid actuated means for controlling operation of said planetary means, two fluid valves associated with said first mentioned valves for controlling the flow of fluid to said fluid actuated means, and a connection between said first mentioned fluid valves and said second mentioned fluid valves to cause operation of said second mentioned valves when said first mentioned valves are in position so both pumps will supply fluid under pressure to said motor, to supply fluid under pressure to said fluid actuated means to cause said driven shaft to be driven at the speed of said motor shaft when said motor is operating at a high speed, and to release fluid from said fluid actuated means to cause said driven shaft to be driven through said planetary means when said motor is operating at a low speed.

6. In a hydraulic power transmission device, a fluid motor having a motor shaft, two fluid pumps for supplying fluid to said motor at different volumes to cause said motor to rotate at different speeds, two selectively operable fluid valves for connecting any one or both of said pumps to supply fluid under pressure to said motor, a driven shaft, planetary reduction means interposed between said motor shaft and said driven shaft, a fluid pressure cylinder and piston for controlling operation of said planetary means, a pair of fluid valves for supplying fluid under pressure to said fluid pressure cylinder and piston, and means operable upon operation of said first mentioned valves, for operating said second mentioned valves when said first mentioned valves are positioned to cause both pumps to supply fluid under pressure to said motor, to supply fluid under pressure to said fluid pressure cylinder and piston to cause said fluid pressure cylinder and piston to connect said transmission device to drive said driven shaft at the speed of said motor shaft when said fluid motor is driven by both of said pumps, and to release fluid from said fluid actuated means when said fluid motor is driven through one of said pumps at a low speed, to cause said driven shaft to be driven through said planetary means.

7. In a hydraulic power transmission device, a fluid motor having a motor shaft, a plurality of fluid pumps for supplying fluid to said motor at different volumes, to cause said motor to rotate at different speeds, a plurality of selectively operable fluid valves, for controlling the connection of any one or all of said fluid pumps to said motor, a driven shaft, planetary reduction means interposed between said motor shaft and said driven shaft, said planetary reduction means including a reaction member, means for holding said reaction member from rotation, while said motor is rotating at a slow speed, and means for rotating said reaction member at the speed of said motor as said motor is driven at a high speed through all of said fluid pumps, said last mentioned means including a clutch, fluid actuated means for releasing said holding means and applying said clutch, a plurality of valves connected in series for controlling operation of said fluid actuated means, each one of said valves being connected with one of said first mentioned valves and being operable therewith, to open upon opening of said first mentioned valves, said last mentioned valves being so connected together as to permit fluid to pass to said fluid actuating means only when all of said first mentioned valves are open, to connect all of said pumps to said motor.

8. In a hydraulic power transmission device, a fluid motor having a motor shaft, two fluid pumps for supplying fluid to said motor at different volumes to cause said motor to rotate at different speeds, two selectively operable fluid valves for connecting any one or all of said pumps to supply fluid under pressure to said motor, a driven shaft, planetary reduction means interposed between said motor shaft and said driven shaft, said planetary reduction means including a reaction member, a friction brake for holding said reaction member from rotation, a friction clutch for rotatably driving said reaction member with said motor, and means for releasing said brake and applying said clutch when both of said pumps are driving said fluid motor at a predetermined high speed including a fluid pressure actuating means having operative connection with said clutch and said brake, two valves connected in series, for controlling the passage of fluid to said actuating means, said valves being operable upon rotation of said first mentioned valves to permit the passage of fluid to said actuating means only when both of said pumps are connected to drive said motor at a high speed.

9. In a hydraulic power transmission device, a fluid motor having a motor shaft, two fluid pumps for supplying fluid to said motor at different volumes to cause said motor to rotate at different speeds, two selectively operable fluid valves for connecting any one or all of said pumps to supply fluid under pressure to said motor, a driven shaft, planetary reduction means interposed between said motor shaft and said driven shaft, said planetary reduction means including a reaction member, a friction brake for holding said reaction member from rotation, a friction clutch for rotatably driving said reaction member with said motor, and means for releasing said brake and applying said clutch when both of said pumps are driving said fluid motor at a predetermined high speed including a fluid pressure actuating means having operative connection with said clutch and said brake, two valves connected in series, for controlling the passage of fluid to said actuating means, and mechanical connections between said first and second mentioned pairs of valves, to cause said second mentioned valves to open upon opening of said first mentioned valves, said second mentioned valves being connected together in series to prevent the passage of fluid to said fluid pressure actuating means except when both of said first mentioned valves are open to drive said motor by both of said pumps.

HERMAN W. DRIEHAUS.